United States Patent Office 3,737,336
Patented June 5, 1973

---

3,737,336
AMINOMETHYL-SUBSTITUTED ORGANOPOLY-SILOXANE AS WATER-REPELLENT AND GLOSS-IMPARTING COATING FOR LACQUERED METAL SURFACES
Hans Dietrich Golitz, deceased, late of Cologne-Stammheim, Germany, by Ingrid Golitz, heir, and Walter Noll, Opladen, Karl Schnurrbusch, Leverkusen-Steinbuchel, Klaus Seyfried, Cologne, and Walter Simmler, Odenthal-Globusch, Germany, assignors to Farbenfabriken Bayer Aktiengesellschaft, Leverkusen, Germany
No Drawing. Original application Mar. 9, 1970, Ser. No. 17,958. Divided and this application Dec. 22, 1971, Ser. No. 210,944
Int. Cl. B32b 15/08; B44d 1/36
U.S. Cl. 117—75                          7 Claims

ABSTRACT OF THE DISCLOSURE

Excellent hydrophobic properties and pleasant gloss are imparted to solid, especially smooth, surfaces, for example lacquer coatings of the bodies of motor vehicles, by applying thereto, according to the invention, new coating compositions containing as the effective agent an organopolysiloxane which is aminomethyl-substituted on at least two of its siloxane units, corresponding to the formula

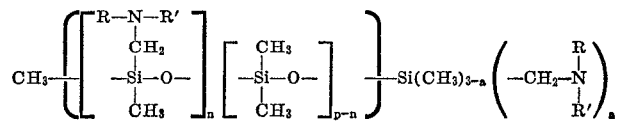

or to the formula

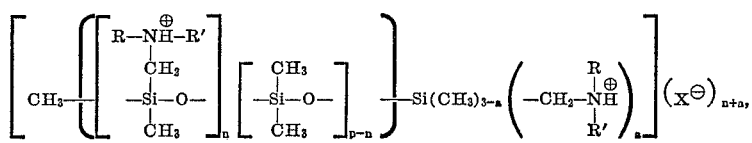

in which
p is an integer greater than 25,
a is 0 or 1,
n is an integer greater than (1−a) and smaller than p/10,
R and R′, independently of one another, are hydrogen atoms or alkyl or cycloalkyl radicals having less than 9 carbon atoms, and
X is a monovalent acid radical.

---

This is a division, of application Ser. No. 17,958 filed Mar. 9, 1970 now abandoned.

The present invention relates to novel coating compositions which impart lasting hydrophobic properties and, in addition, a pleasant gloss to solid, especially smooth, surfaces, for example to the lacquer coatings of the bodies of motor vehicles.

It is known to use for this purpose poydimethylsiloxane oils in combination with waxes. Such agents for the care of lacquer are not satisfactory, however, because they cannot be applied with sufficient ease, give only poor hydrophobic properties and a weak gloss, and are easily removed from the substrate by means of detergents.

The more recently disclosed composition, consisting of waxes, short-chain polydimethyl-siloxanes with terminal silanol groups and aminoalkylalkoxy-silanes, have the same disadvantages with regard to evenness of distribution on the surface of the substrate and also the gloss obtained.

Coating agents which are more advantageous, especially for the care of lacquer and polish, have now been found in the form of certain linear organo-siloxane copolymers which are aminomethyl-substituted on at least two of their siloxane units. These polymers correspond to the general formula

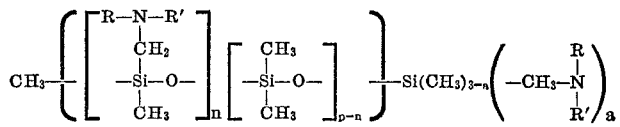

or to the general formula

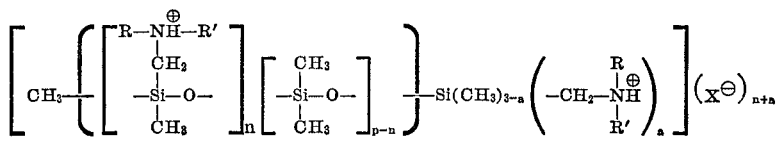

in which p is a number greater than 25, preferably one of the numbers from 45 to 250;

a is 0 or 1;

n is a number greater than (1−a) and smaller than p/10, preferably a number between p/40 and p/15;

R and R′, independently of one another, are hydrogen atoms or alkyl or cycloalkyl radicals with less than 9 carbon atoms; and X is a monovalent acid radical, preferably a fatty acid radical having 1 to 3 carbon atoms.

Compounds of this type can be obtained by several known methods, for example by the hydrolysis of mixtures of the calculated amounts of methyl-substituted and methyl- and bromomethyl-substituted chlorosilanes, and the reaction of the resultant siloxanes of the general formula

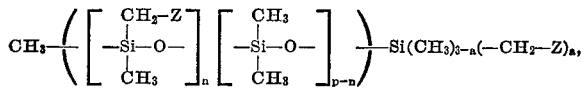

in which Z is Cl or (preferably) Br, with an excess of an amine of the general formula R—NH—R′. The amine-basic polysiloxanes initially obtained can then be converted with acids, e.g. acetic acid, into the corresponding salts.

The aminomethyl-substituted organo-siloxane copolymers of the formulae given above have the unexpected property of spreading extremely quickly over the surfaces of a wide variety of substances to form coherent films and to impart to these surfaces hydrophobic properties withstanding the attack of detergents, even if these are many times applied, which properties cannot be achieved by conventional means. The aforesaid copolymers are therefore eminently suitable for the preparation of agents for the care of lacquer which, in contrast to the compositions mentioned in the second and third paragraphs hereof, can be applied extremely easily. For example, it is only necessary to pour their solutions in water-miscible solvents, such as isopropanol or acetone, which solutions may also contain a small excess of an acid of the general formula XH, into a great excess (e.g. twenty times their weight) of water or to introduce them into a water current by means of an injector, to prepare, in the simplest possible way, an emulsion which can easily be applied to the surface to be coated by spraying, pouring, spreading or dipping. There remains only to remove the excess emulsion by rinsing with water; the residual rinsing water then lies on the treated surface, for example the external surfaces of a motor vehicle, in the form of droplets of so wide an angle of contact that they are blown away simply by the current of air caused by driving. Repolishing, which is necessary when conventional coating agents are used, can be dispensed with in this case, as the surfaces immediately acquire a gloss of such quality that it can not be improved even by polishing.

The protective film attained by means of the surface treatment according to the invention proves to be very resistant to detergents; the gloss and the water-repellent effect are not reduced even by washing ten times with one of the conventional detergent solutions.

The following examples are given for the purpose of illustrating the invention.

EXAMPLES 1 TO 4

A series of four organo-polysiloxane copolymers according to the invention are obtained by first hydrolyzing in known manner mixtures of organo-chlorosilanes of the formulae and in the amounts given below (the parts are parts by weight), and equilibrating the hydrolysis products in the presence of acid-activated bleaching earth. The mixture components used for the purpose are 8900 parts $(CH_3)_2SiCl_2$ each time and, in addition, in Example 1, 416 parts $BrCH_2Si(CH_3)Cl_2$ and 435 parts $(CH_3)_3SiCl$;

Example 2, 416 parts $BrCH_2Si(CH_3)Cl_2$ and 375 parts $BrCH_2Si(CH_3)_2Cl$;

Example 3, 580 parts $BrCH_2Si(CH_3)Cl_2$ and 525 parts $BrCH_2Si(CH_3)_2Cl$;

Example 4, 375 parts $BrCH_2Si(CH_3)_2Cl$.

The brominated methyl-polysiloxane oils resultant from the equilibration are reacted in Examples 1, 2 and 4 with 2400 parts, and in Example 3 with 4000 parts, of cyclohexylamine, the oil is separated from the precipitated cyclohexyl-ammonium bromide by filtration, and the filtrate is separated from the excess of cyclohexylamine by evaporation under reduced pressure. There remain polysiloxanes of Formula I in which R is cyclohexyl, R′ is H and in Example 1: $a=0$, $n=2$ and $p=30$;
Example 2: $a=1$, $n=3$ and $p=72$;
Example 3: $a=1$, $n=3$ and $p=48$;
Example 4: $a=1$, $n=1$ and $p=69$.

Portions of 100 parts thereof are mixed in

Example 1 with 8 parts acetic acid;
Example 2 with 8 parts acetic acid;
Example 3 with 11.2 parts acetic acid;
Example 4 with 4 parts acetic acid, and, in addition, in one series of Examples, 1a to 4a, with 292 parts isopropanol, and in a second series of Examples, 1b to 4b, with 292 parts acetone. In this way there are obtained eight solutions of salts of Formula II, in which X is $CH_3C(O)O$.

The properties of the coatings which can be produced with these eight solutions were tested as follows:

Eight pieces of sheet iron which were coated with car body lacquer were washed with an aqueous solution of 0.1 percent by weight of an anion-active detergent which is at present commercially available under the trade name "Pril." An emulsion was prepared from each of the solutions 1a to 4a and 1b to 4b described above by pouring 25 cc. of each solution into 10 litres of water. Each of the emulsions was poured over one of the washed pieces of sheet iron, and then rinsed off with water. The lacquered surfaces of all the sheets were then so water-repellent that the drops initially remaining thereon could easily be blown off, and the surfaces exhibited excellent gloss.

The resistance of the coatings produced according to the invention to washing was tested by impregnating a soft sponge with the detergent solution used before, rubbing the coated surfaces for one minute and then rinsing with water. This wash cycle was repeated nine times with the result that only the lacquer surfaces treated with the emulsions of Examples 3a, 3b and 1b exhibited a marked reduction of gloss and hydrophobicity.

A metal sheet treated for comparison with a commercial washing preservative and treated analogously showed a marked reduction of hydrophobicity even after the first wash cycle, and a complete loss of hydrophobicity after the second wash cycle.

What we claim is:

1. The method of imparting gloss and water-repellency to lacquered metal surfaces, which comprises coating said surfaces with an agent comprising as the essential ingredient a salt of a flowable aminomethyl-substituted linear organosiloxane copolymer, said salt corresponding to the general formula

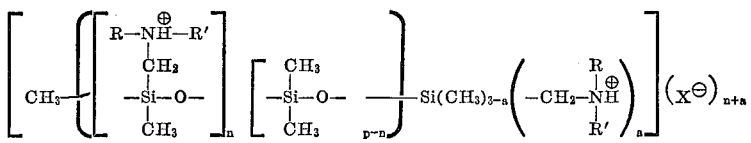

in which p is an integer greater than 25 up to about 250;
a is selected from zero and one;
n is an integer greater than $(1-a)$ and smaller than $p/10$;
R and R', independently of one another, are selected from the group consisting of hydrogen atoms and alkyl and cycloalkyl radicals having less than 9 carbon atoms; and
X is a monovalent acid radical.

2. A method according to claim 1, wherein in said copolymer
p is an integer from 45 to 250;
n is an integer between $p/40$ and $p/15$; and
X is a fatty acid radical having 1 to 3 carbon atoms.

3. A method according to claim 1, said agent comprising in addition to said copolymer a water-miscible solvent.

4. A method according to claim 3, wherein said solvent is selected from acetone and isopropanol.

5. A method according to claim 3, said agent comprising a small excess of an acid of the formula XH.

6. A method according to claim 3, wherein the agent and solvent are mixed with at least 20 times their weight in water.

7. A method according to claim 1 wherein in said copolymer X is the radical $CH_3C(O)O$.

References Cited
UNITED STATES PATENTS

| | | | |
|---|---|---|---|
| 2,947,771 | 8/1960 | Bailby | 260—448.2 N |
| 3,068,199 | 12/1962 | Sellers | 260—448.2 N |
| 3,175,921 | 3/1965 | Hedlund | 117—75 |
| 3,087,909 | 4/1963 | Morehouse et al. | 117—75 X |
| 3,336,158 | 8/1967 | Wada et al. | 117—132 BS X |
| 3,247,281 | 4/1966 | Gagliardi | 117—161 ZA X |
| 3,058,850 | 10/1962 | Sell | 117—161 ZA X |
| 3,222,213 | 12/1965 | Clark | 117—75 X |

RALPH HUSACK, Primary Examiner

U.S. Cl. X.R.

106—287 SB; 117—132 BS, 161 ZA; 260—46.5 E, 448.2 N